(12) United States Patent
Vivek et al.

(10) Patent No.: US 12,552,388 B2
(45) Date of Patent: Feb. 17, 2026

(54) DEVICES AND METHODS OF DETECTING DRIVING CONDITIONS FROM A ROTATING WHEEL

(71) Applicant: TDK Corporation, Tokyo (JP)

(72) Inventors: Vibhu Vivek, Santa Clara, CA (US); Ryan Griswold, San Martin, CA (US); John Sze, Saratoga, CA (US)

(73) Assignee: TDK CORPORATION, Tokyo (JP)

( * ) Notice: Subject to any disclaimer, the term of this patent is extended or adjusted under 35 U.S.C. 154(b) by 295 days.

(21) Appl. No.: 17/947,466

(22) Filed: Sep. 19, 2022

(65) Prior Publication Data

US 2023/0092841 A1    Mar. 23, 2023

Related U.S. Application Data

(60) Provisional application No. 63/247,245, filed on Sep. 22, 2021.

(51) Int. Cl.
*B60W 40/06* (2012.01)
*B60C 19/00* (2006.01)

(52) U.S. Cl.
CPC ............. *B60W 40/06* (2013.01); *B60C 19/00* (2013.01); *B60C 2019/004* (2013.01)

(58) Field of Classification Search
CPC ...... B60W 40/06; B60W 40/12; B60W 40/10; B60C 19/00; B60C 2019/004
See application file for complete search history.

(56) References Cited

U.S. PATENT DOCUMENTS

| | | |
|---|---|---|
| 6,339,956 B1 | 1/2002 | Huinink et al. |
| 2006/0022555 A1 | 2/2006 | Balasubramaniam et al. |
| 2010/0164705 A1 | 7/2010 | Blanchard |
| 2010/0274607 A1 | 10/2010 | Carresjo et al. |
| 2011/0308683 A1 | 12/2011 | Crano |
| 2014/0257629 A1* | 9/2014 | Singh ................. B60T 8/1725 701/34.4 |
| 2015/0311826 A1* | 10/2015 | Trauernicht ......... H10N 30/306 29/25.35 |

(Continued)

FOREIGN PATENT DOCUMENTS

| | | |
|---|---|---|
| EP | 2186657 A1 | 5/2010 |
| JP | 2006-153832 A | 6/2006 |

(Continued)

OTHER PUBLICATIONS

Lee, K. I., et al. "Energy harvesting by rotation of wheel for tire monitoring system, in 2012 IEEE sensors." (2012): 1-4. (Year: 2012).*

(Continued)

*Primary Examiner* — Russell Frejd
*Assistant Examiner* — Ana D Thomas
(74) *Attorney, Agent, or Firm* — Morgan, Lewis & Bockius LLP

(57) ABSTRACT

A sensor assembly may include one or more sensors mountable on a wheel of a vehicle and one or more processors electrically coupled to the one or more sensors for determining a driving condition of the vehicle based on the first sensor signals and the second sensor signals. Methods for determining a driving condition of a vehicle based on sensor signals and a wheel assembly that includes a wheel and the sensor assembly are also disclosed.

19 Claims, 14 Drawing Sheets

(56) References Cited

U.S. PATENT DOCUMENTS

2020/0049581 A1    2/2020  Thornham et al.
2020/0114706 A1*   4/2020  Vivek ................... B60B 21/12
2022/0381835 A1*  12/2022  Yang .................... B60L 58/20

FOREIGN PATENT DOCUMENTS

| JP | 2007-153034 A | 6/2007 |
| JP | 2007-253677 A | 10/2007 |
| JP | 2009-061917 A | 3/2009 |
| JP | 2010-159031 A | 7/2010 |
| JP | 2021-067664 A | 4/2021 |

OTHER PUBLICATIONS

Sui, Zhipeng, et al. "Piezoelectric Based Smart Tire for Vehicle Speed and Load Detection and Energy Harvesting." 2021 IEEE International Conference on Flexible and Printable Sensors and Systems (FLEPS). IEEE, 2021. (Year: 2021).*

Sui, Zhipeng, et al. "Piezoelectric Based Smart Tire for Vehicle Speed and Load Detection and Energy Harvesting." 2021 IEEE International Conference on Flexible and Printable Sensors and Systems (FlLEPS). IEEE, 2021. (Year: 2021).*

Extended European Search Report issued in related European Patent Application No. 22207708.3 dated Apr. 4, 2023.

Communication pursuant to Rules 161(2) and 162 EPC dated Jun. 26, 2024, issued in corresponding European Patent Application No. 22873873.8.

International Search Report issued in corresponding International Patent Application No. PCT/US2022/076890 dated Dec. 28, 2022.

Written Opinion issued in corresponding International Patent Application No. PCT/US2022/076890 dated Dec. 28, 2022.

International Search Report issued in related International Patent Application No. PCT/JP2022/032385 dated Nov. 1, 2022.

International Search Report issued in related International Patent Application No. PCT/JP2022/032393 dated Nov. 1, 2022.

* cited by examiner

DEVICES AND METHODS OF DETECTING DRIVING CONDITIONS FROM A ROTATING WHEEL

PRIORITY AND RELATED APPLICATIONS

This application claims priority to U.S. Provisional App. No. 63/247,245, filed Sep. 22, 2021, entitled "Devices and Methods of Detecting Driving Conditions from a Rotating Wheel," which is incorporated by reference herein in its entirety.

TECHNICAL FIELD

This application relates generally to vehicle sensors, and more particularly to vehicle sensors mountable to vehicle tires, rims, and wheels.

BACKGROUND

Advances in automotive sensing technologies have improved the safety and performance of automotive vehicles, which has led to a greater demand for advanced sensing applications to complement the existing electronic safety systems.

SUMMARY

Such demand has led to measurements of temperature, pressure, acceleration, and forces (static and dynamic) exerted on tires, wheels, and automotive vehicles. However, many of these sensors require electrical power for operation and data transmission. In addition, frequent measurements (and transmission) of data have increased an amount of power required for such sensors. Energy storage devices (e.g., lithium ion batteries) have a limited capacity and often present challenges associated with low durability, difficulty of replacement, and inferior sustainability. Such energy storage devices are typically subjected to accelerated discharge cycles, resulting in frequent or premature replacement of entire sensor modules, thereby increasing the overall cost of ownership and maintenance for the automotive vehicle.

The devices and methods described herein address challenges associated with conventional devices and methods for providing electrical power to sensor modules. Utilizing an energy-harvesting device (e.g., an electrical power generator that converts kinetic, thermal, optical, and mechanical energy available from the automotive vehicle, such as rotation, acceleration, deceleration, and/or vibration, of the wheels, into electrical energy) may replace conventional energy storage devices or, when used in conjunction, prolong the life expectancy of such energy storage devices. Such energy-harvesting devices are typically mounted where the source energy (e.g., kinetic, thermal, optical, or mechanical energy) is readily available (e.g., adjacent to a bead area of a tire mounted in a wheel). Additionally, an energy-harvesting device may be used as a sensor on its own, as the electrical signal from the energy-harvesting device contains information about the movement of the energy-harvesting device and a portion of the tire and/or the wheel where the energy-harvesting device is mounted. Especially when the energy-harvesting devices are mounted where the source energy is readily available, the energy-harvesting devices may have high sensitivity in detecting changes in the source energy (e.g., kinetic, thermal, optical, or mechanical energy, such as vibrations).

In accordance with some embodiments, a method includes receiving first sensor signals and second sensor signals from one or more sensors mounted adjacent to a wheel of a vehicle; and determining a driving condition of the vehicle based on the first sensor signals and the second sensor signals.

In accordance with some embodiments, a sensor assembly includes one or more sensors mountable on a wheel of a vehicle; and one or more processors electrically coupled to the one or more sensors for determining a driving condition of the vehicle based on the first sensor signals and the second sensor signals.

In accordance with some embodiments, a wheel assembly includes a wheel and any sensor assembly described herein. The sensor assembly is mounted adjacently to the wheel.

BRIEF DESCRIPTION OF THE DRAWINGS

The disclosed devices and methods allow electrical connection between an energy-harvesting device and other electrical components located inside a tire and/or a wheel.

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

Figure 1A:
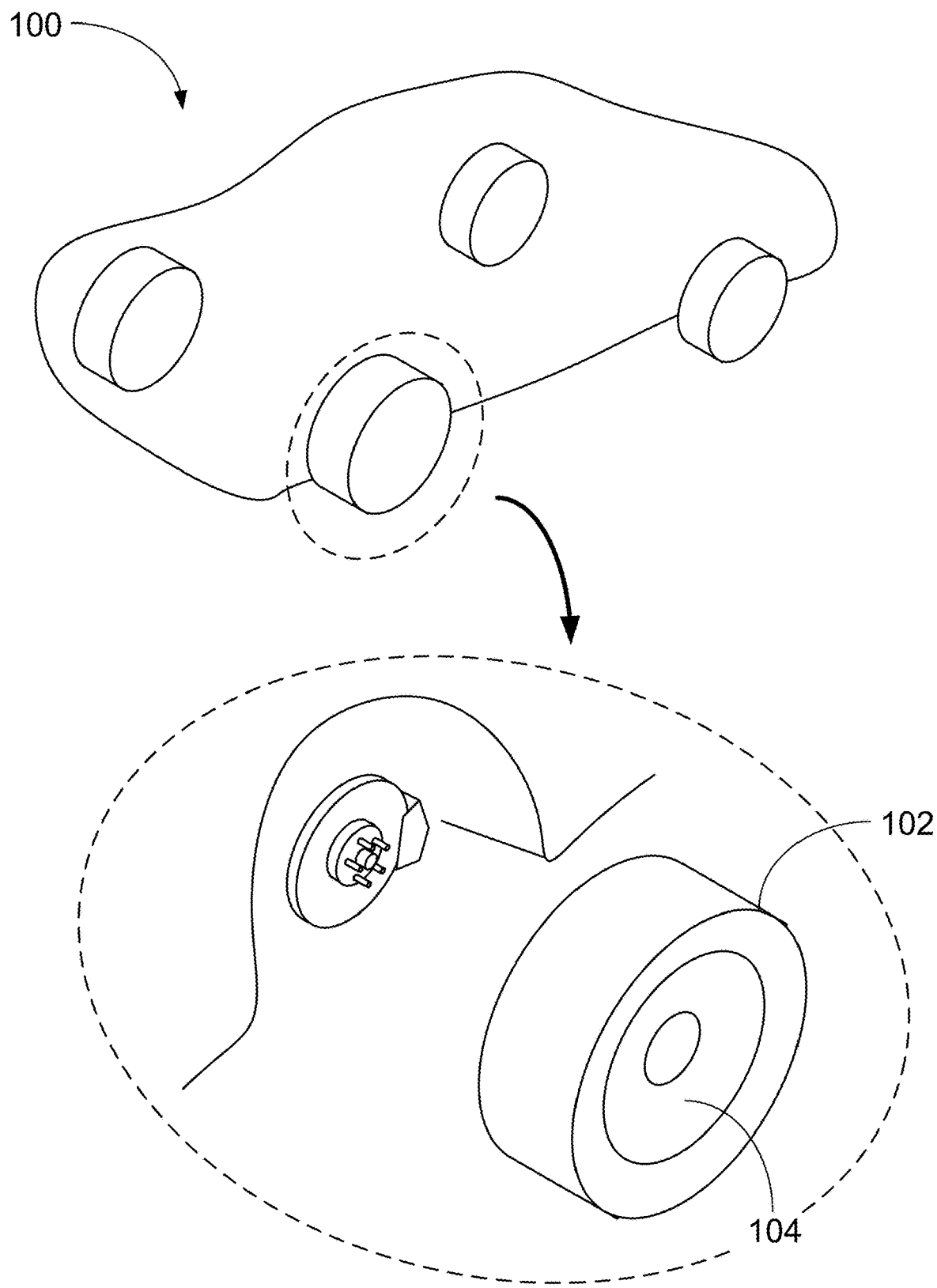
FIG. 1A is a schematic diagram illustrating parts of an automobile in accordance with some embodiments.

FIG. 1A is a schematic diagram illustrating parts of a vehicle 100 (e.g., an automobile) in accordance with some embodiments. In some embodiments, the vehicle 100 includes a wheel 104 and a tire 102 mounted on the wheel 104.

Figure 1B:
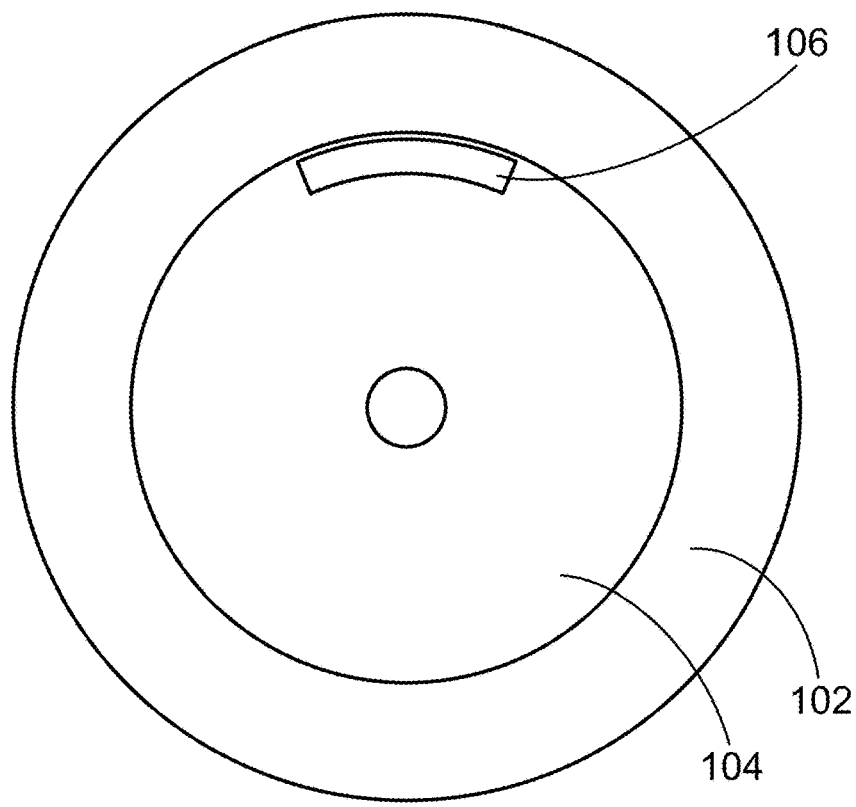
FIG. 1B is a schematic diagram illustrating an energy-harvesting device mounted on a wheel in accordance with some embodiments.

FIG. 1B is a schematic diagram illustrating an energy-harvesting device 106 mounted adjacent to a wheel 104 (e.g., mounted on the wheel 104) in accordance with some embodiments. In FIG. 1B, the energy-harvesting device 106 is positioned adjacent to a rim of the wheel 104. Positioning of the energy-harvesting device 106 adjacent to the rim of the wheel 104 is advantageous for energy-harvesting devices that utilize the centrifugal force, its variation, and/or associated vibration for energy harvesting (e.g., converting kinetic, mechanical energy into electrical energy). Although FIG. 1B shows only one energy-harvesting device 106 mounted on the wheel 104, in some embodiments, two or more energy-harvesting devices are mounted on the wheel 104. In some embodiments, the energy-harvesting device 106 is positioned adjacent to the rim on a side of the wheel facing away from the automobile. In some embodiments, the energy-harvesting device 106 is positioned adjacent to the rim on a side of the wheel facing toward the automobile.

Figure 1C:
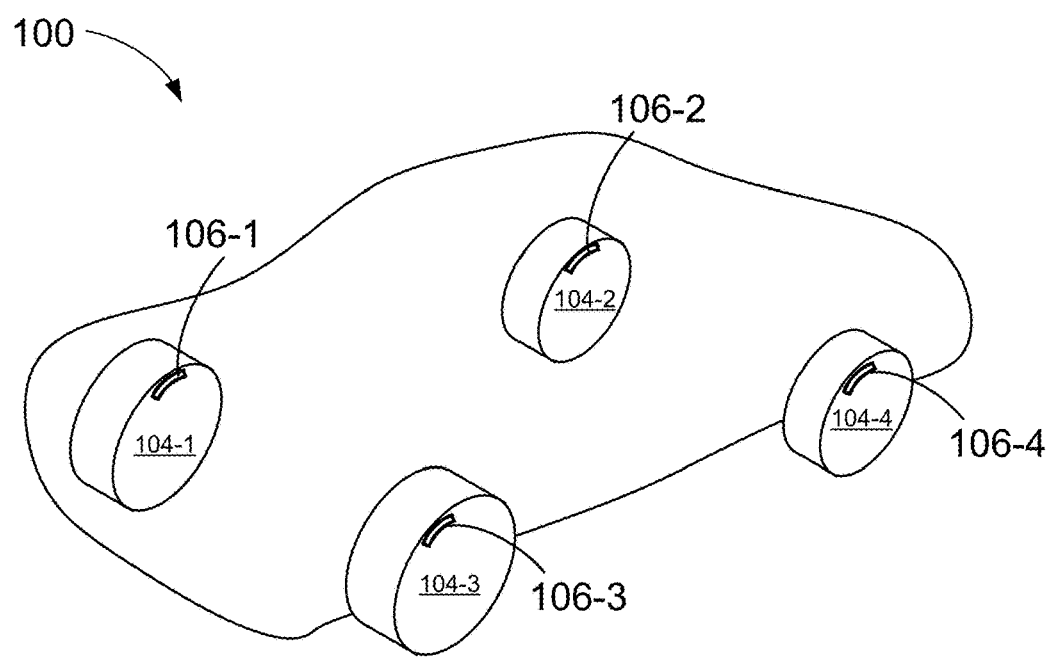
FIG. 1C is a schematic diagram illustrating an automobile with energy-harvesting devices mounted on the wheels in accordance with some embodiments.

FIG. 1C is a schematic diagram illustrating the automobile 100 with energy-harvesting devices 106 mounted on the wheels 104 in accordance with some embodiments. In some embodiments, each wheel 104 includes one or more energy-harvesting devices. In some embodiments, the automobile 100 includes an electrical component (e.g., a controller) in communication (e.g., wireless communication) with the energy-harvesting devices 106 and configured to aggregate the data from the energy-harvesting devices 106. In some embodiments, the electrical component is configured to determine a driving condition, braking condition, and/or load distribution based on the aggregated data from the energy-harvesting devices 106.

Figure 1D:
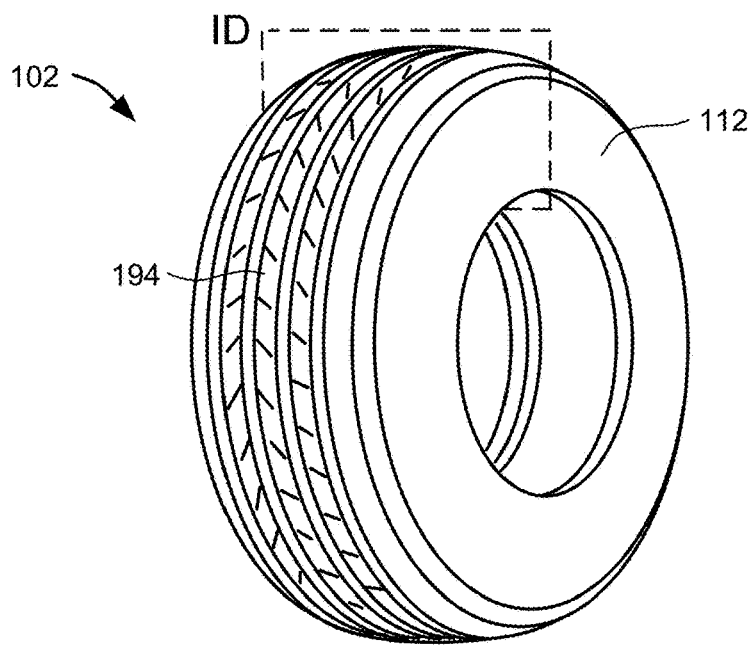
FIG. 1D illustrates a tire in accordance with some embodiments.

FIG. 1D illustrates a tire 102 in accordance with some embodiments. The tire 102 has a side wall 112 and a tread region 194 on which electrical connectors may be mounted to electrically connect an energy-harvesting device to one or more electrical components located within the tire 102. FIG. 1D also shows a plane ID from which the cross-section shown in FIG. 1E is taken.

Figure 1E:
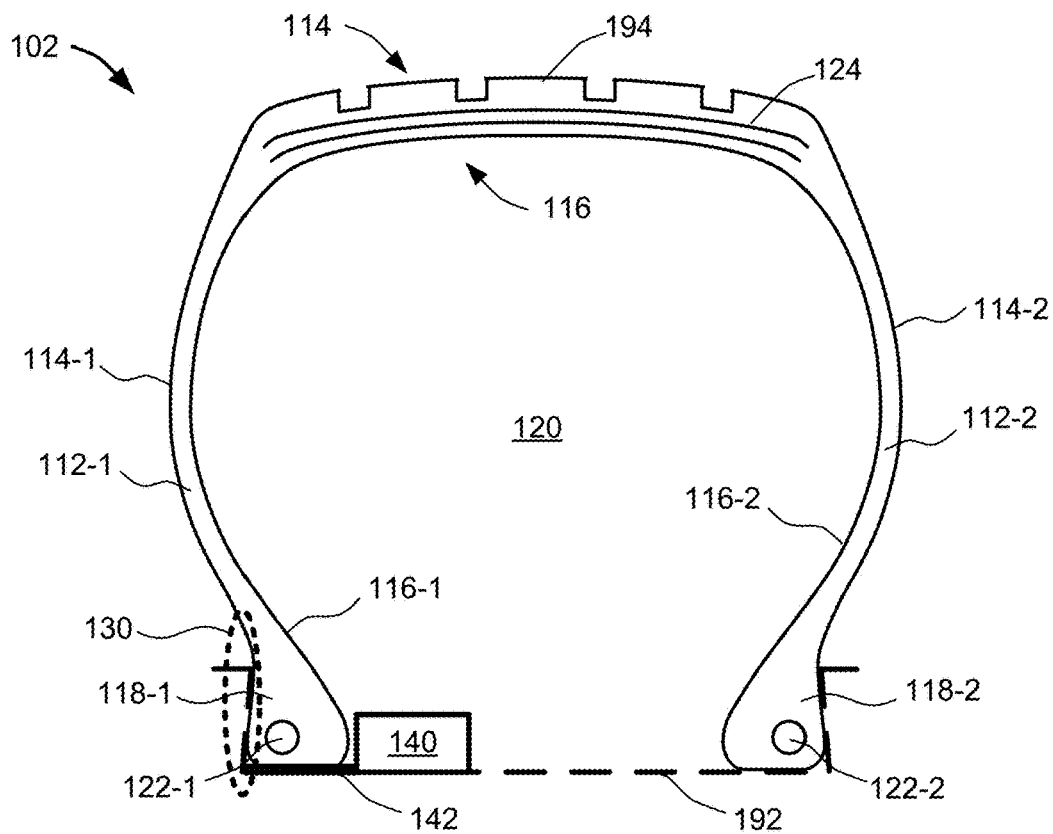
FIG. 1E is a cross-sectional view of the tire shown in FIG. 1D in accordance with some embodiments.

FIG. 1E is a cross-sectional view of the tire 102 shown in FIG. 1D in accordance with some embodiments. The tire 102 has the tread region 194 extending between two side walls 112-1 and 112-2 (one of which may be called an outer side wall and the other may be called an inner side wall, or vice versa, depending on an orientation of how the tire is mounted on a wheel). The tire 102 has an outer surface 114, including a portion 114-1 of the outer surface 114 on the outer side wall 112-1 and a portion 114-2 of the outer surface 114 on the inner side wall 112-2, and an inner surface 116, including a portion 116-1 of the inner surface 116 on the outer side wall 112-1 and a portion 116-2 of the inner surface 116 on the inner side wall 112-2. The tire 102 also has bead regions 118-1 and 118-2, which contacts a rim 192 of a wheel 104 when the tire 102 is mounted on the wheel 104. In FIG. 1E, the bead regions 118-1 and 118-2 also include bead wires 122-1 and 122-2. In FIG. 1E, the tire also includes one or more belts 124 in the tread region 194.

Although the tire 102 has an open shape (e.g., air may freely enter the space 120 between the side walls 112-1 and 112-2 through an opening toward a center of the tire when the tire is not mounted on a wheel), when the tire 102 is mounted on a wheel, the rim 192 of the wheel seals the opening so that the air within the space 120 is maintained within the space 120. As used herein, this space 120 is called an inside space of the tire 102.

In some configurations, one or more electrical components 140 are located within the space 120 of the tire 102 (e.g., one or more sensors to measure rotation, acceleration, deceleration, vibration, temperature, pressure, etc.) while one or more energy-harvesting devices are located outside the space 120 (e.g., a region 130 between the rim 192 or its rim lip and the bead region 118-1 or 118-2). In some embodiments, an electrical connector 142 relays power and/or electrical signals from the one or more energy-harvesting devices located outside the space 120 to the one or more electrical components 140 located within the space 120. In some embodiments, the vehicle includes one or more processors that are communicatively coupled to respective electrical components at each wheel of the vehicle. For example, each set of electrical components are configured to process/analyze energy harvester signals for a particular wheel and the processor(s) are configured to process/analyze (e.g., compare) energy harvester signals between wheels.

Figure 1F:
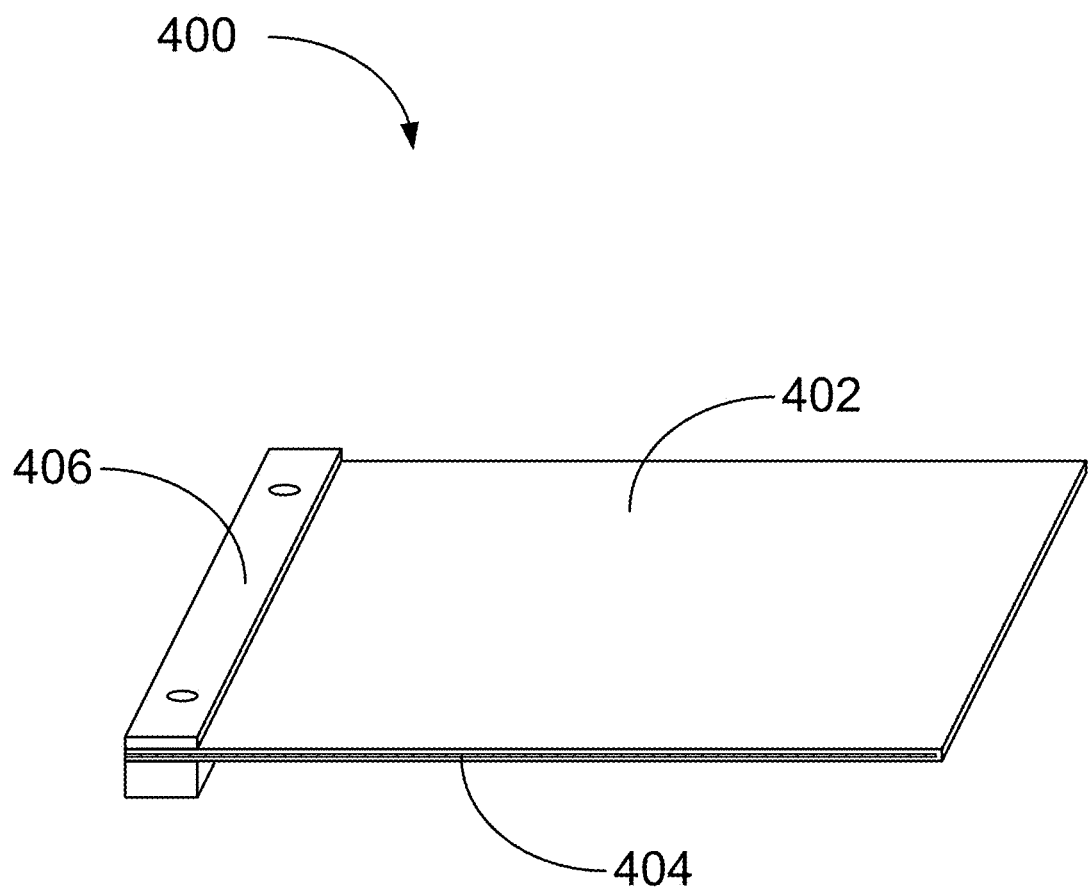
FIG. 1F is a schematic diagram illustrating an energy harvester in accordance with some embodiments.

FIG. 1F is a schematic diagram illustrating an energy harvester 400 (also called an energy generator, an energy harvester module, or an energy harvesting sensor) in accordance with some embodiments. In some embodiments, one or more of the energy harvesters described herein (e.g., energy harvester 106 described with respect to FIG. 1B) have a structure corresponding to, or analogous to, the structure of the energy harvester 400.

In FIG. 1F, the energy harvester 400 includes a cantilever 402. In some embodiments, the cantilever 402 is a projecting beam supported by one end. In some embodiments, the cantilever 402 has a uniform width and a uniform thickness along its length, as shown in FIG. 1F. In some embodiments, the cantilever 402 has (1) a non-uniform width along its length while its thickness remains uniform along its length, (2) a non-uniform thickness along its length while its width remains uniform along its length, or (3) a non-uniform width and a non-uniform thickness along its length.

In some embodiments, the cantilever 402 includes a piezoelectric material 404. Examples of piezoelectric materials include gallium nitride, indium nitride, aluminum nitride, zinc oxide, barium titanate, lead zirconate titanate, potassium niobate, sodium tungstate, Ba2NaNb5O5, Pb2KNb5O5, single crystalline zinc oxide, langasite, gallium orthophosphate, lithium niobate, lithium tantalite, sodium potassium niobate, bismuth ferrite, sodium niobate, bismuth titanate, sodium bismuth titanate, quartz, berlinite, topaz, lead titanate, and piezoelectric polymers, such as polyvinylidene fluoride, polyamides, paralyne-C, polyimide, and polyvinylidene chloride. Piezoelectric materials are capable of generating electrical charge in response to applied mechanical strain. Thus, when the cantilever 402 bends, the piezoelectric material provides charges that are indicative of the amplitude of strain and strain rate as a result of how much the cantilever 402 is bent (e.g., a displacement of a free end of the cantilever 402). Similarly, when the cantilever 402 vibrates, the piezoelectric material in the cantilever 402 provides an (oscillating) electrical signal that corresponds to the vibration of the cantilever 402.

The length, width, and thickness of the cantilever 402 are selected to obtain a desired performance of the energy harvester 400. In some embodiments, the length is between 1 cm and 30 cm, between 1 cm and 10 cm, between 5 cm and 15 cm, between 10 cm and 20 cm, between 15 cm and 25 cm, between 20 cm and 30 cm, between 1 cm and 5 cm, between 5 cm and 10 cm, between 10 cm and 15 cm, between 15 cm and 20 cm, between 20 cm and 25 cm, between 25 cm and 30 cm, between 1 cm and 3 cm, between 2 cm and 4 cm, between 3 cm and 5 cm, between 4 cm and 6 cm, between 5 cm and 7 cm, between 6 cm and 8 cm, between 7 cm and 9 cm, or between 8 cm and 10 cm. In some embodiments, the length is approximately 1 cm, approximately 2 cm, approximately 3 cm, approximately 4 cm, approximately 5 cm, approximately 6 cm, approximately 7 cm, approximately 8 cm, approximately 9 cm, approximately 10 cm, approximately 15 cm, approximately 20 cm, approximately 25 cm, or approximately 30 cm. In some embodiments, the width is between 1 cm and 10 cm, between 5 cm and 15 cm, between 10 cm and 20 cm, between 1 cm and 5 cm, between 5 cm and 10 cm, between 10 cm and 15 cm, between 15 cm and 20 cm, between 1 cm and 4 cm, between 2 cm and 5 cm, between 3 cm and 6 cm, between 4 cm and 7 cm, between 5 cm and 8 cm, between 6 cm and 9 cm, or between 7 cm and 10 cm. In some embodiments, the width is approximately 1 cm, approximately 2 cm, approximately 3 cm, approximately 4 cm, approximately 5 cm, approximately 6 cm, approximately 7 cm, approximately 8 cm, approximately 9 cm, approximately 10 cm, approximately 15 cm, or approximately 20 cm. In some embodiments, the thickness of the cantilever 402 is between 100 μm and 5 mm, between 100 μm and 3 mm, between 1 mm and 4 mm, between 2 mm and 5 mm, between 100 μm and 1 mm, between 500 μm and 1.5 mm, between 1 mm and 2 mm, between 1.5 mm and 2.5 mm, between 2 mm and 3 mm, between 2.5 mm and 3.5 mm, between 3 mm and 4 mm, between 3.5 mm and 4.5 mm, between 4 mm and 5 mm, between 100 μm and 500 μm, between 500 μm and 1 mm, between 1 mm and 1.5 mm, between 1.5 mm and 2 mm, between 2 mm and 2.5 mm, or between 2.5 mm and 3 mm. In some embodiments, the thickness of the cantilever 402 is approximately 100 μm, approximately 200 μm, approximately 300 μm, approximately 400 μm, approximately 500 μm, approximately 600 μm, approximately 1 mm, approximately 2 mm, approximately 3 mm, approximately 4 mm, or approximately 5 mm.

In some embodiments, the thickness of a layer of the piezoelectric material in the cantilever 402 is between 10 μm and 1 mm, between 100 μm and 500 μm, between 200 μm and 600 μm, between 300 μm and 700 μm, between 400 μm and 800 μm, between 500 μm and 900 μm, between 600 μm and 1 mm, between 50 μm and 150 μm, between 100 μm and 200 μm, between 150 μm and 250 μm, between 200 μm and 300 μm, between 250 μm and 350 μm mm, between 300 μm and 400 μm, between 350 μm and 450 μm, between 400 μm and 500 μm, between 500 μm and 600 μm, between 600 μm and 700 μm, between 700 μm and 800 μm, or between 800 μm and 900 μm. In some embodiments, the thickness of the layer of the piezoelectric material in the cantilever 202 is approximately 100 μm, approximately 200 μm, approximately 300 μm, approximately 400 μm, approximately 500 μm, approximately 600 μm, approximately 700 μm, approximately 800 μm, approximately 900 μm, approximately 1 mm, approximately 2 mm, approximately 3 mm, approximately 4 mm, or approximately 5 mm.

In some embodiments, the cantilever 402 includes a single layer of piezoelectric material. In some embodiments, the cantilever 402 includes two or more layers of piezoelectric material. In some embodiments, the two or more layers of piezoelectric material are separated by one or more interleaving layers of an insulating material or a conductive material.

FIG. 1F also shows a clamp 406 that is configured to support and immobilize one end of the cantilever 402. In FIG. 1F, the clamp 406 has a shape of a plate. However, a clamp having any other shape may be used. Although FIG. 1F shows that the clamp 406 is located at the tip of the cantilever 402, the clamp 406 does not need to be aligned with a tip of the cantilever 402. For example, the clamp 406 may be positioned offset from the tip of the cantilever 402 (e.g., by 1 mm, 2 mm, 3 mm, 4 mm, 5 mm, 7 mm, 10 mm, 15 mm, 20 mm, 25 mm, etc.) so that there is an overhang when the clamp 406 is positioned on the cantilever 402. In some embodiments, the cantilever 402 extends in a single direction from the clamp 406. In some embodiments, the cantilever 402 extends in multiple directions (e.g., in two opposite directions) from the clamp 406.

In some embodiments, the clamp 406 and/or the cantilever 402 have one or more through-holes for securing the cantilever 402 and the clamp to a base (e.g., a rim and/or other component of a wheel). For example, screws may be placed through corresponding through-holes for immobilizing the clamp 406 and the cantilever 402. Alternatively, other mechanisms may be used for immobilizing the cantilever 402. For example, the clamp 406 and the cantilever 402 may have slits through which a clip is inserted to immobilize the clamp 406 and the cantilever 402. In another example, the cantilever 402 may be integrated with its base, in which case the clamp 406 is omitted. In some embodiments, the clamp 406 and/or the cantilever 402 include one or more components for mounting the energy harvester 400 to a wheel (e.g., a rim and/or tire of a wheel). In some embodiments, the energy harvester 400 is configured to mount to the inside space 120 of the tire 102 (e.g., mount to a rim of the tire such that the cantilever receives a strain due to deformations of the inner surface of the tire 102). In some embodiments, the energy harvester 400 is configured to mount to the outside space 130 of the tire 102 (e.g., mount to a rim of the tire such that the cantilever receives a strain due to deformations of the outer surface of the tire 102).

Figure 2A:
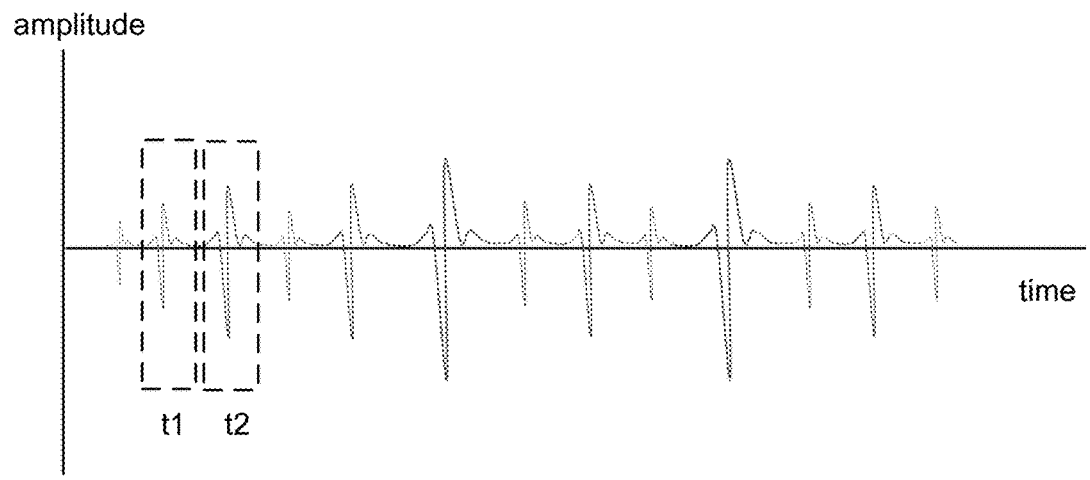
FIG. 2A shows example signals from an energy harvester in accordance with some embodiments.

FIG. 2A shows example signals (e.g., electrical signals) from the energy harvester 106 in accordance with some embodiments. The signals from the energy harvester 106 are generated while the wheel 104 on which the energy harvester 106 is mounted rotates (e.g., while the vehicle with the energy harvester 106 is driving).

Figure 2B:
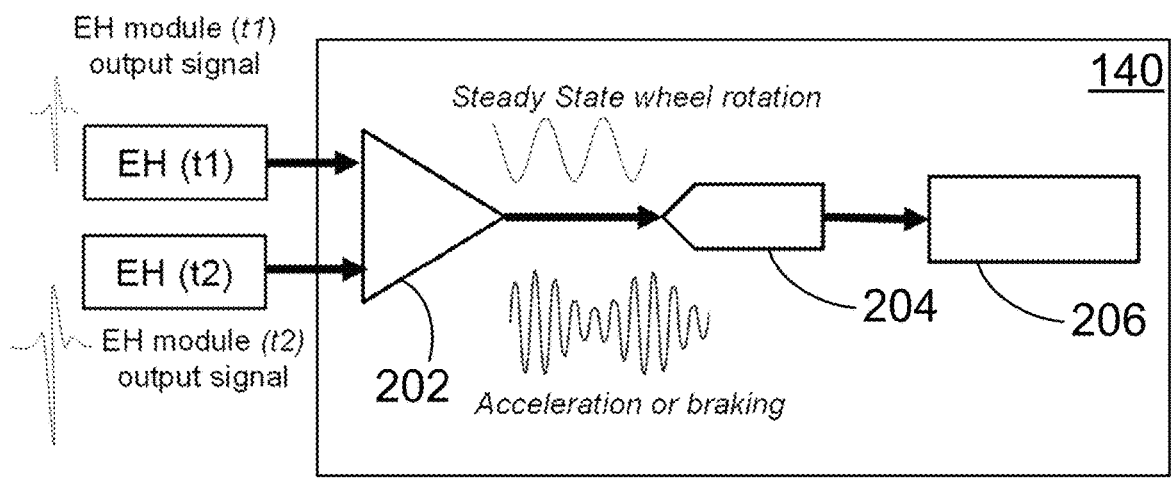
FIG. 2B shows example electrical components used to process signals from an energy harvester in accordance with some embodiments.

FIG. 2B shows example electrical components used to process the signals from the energy harvester 106 in accordance with some embodiments. In FIG. 2B, analog front end (AFE) circuit 202 receives and processes signals generated by the energy harvester 106 at two different time points or within two different time windows (t1 and t2 shown in FIG. 2A). In some embodiments, the AFE circuit 202 includes (or is coupled to) memory for storing the signals from the energy harvester 106 so that the signals received from the energy harvester 106 at a first time are compared (or processed) with the signals received from the energy harvester 106 at a second time that is subsequent to the first time. In some embodiments, the AFE circuit 202 includes (or is coupled to) a propagation delay circuit so that the signals received from the energy harvester 106 at the first time are compared (or processed) with the signals received from the energy harvester 106 at the second time. In some embodiments, the AFE circuit 202 combines the signals received from the energy harvester 106 at the first time and the signals received from the energy harvester 106 at the second time (e.g., the AFE circuit 202 generates signals representing a superposition of the signals received from the energy harvester 106 at the first time and the signals received from the energy harvester 106 at the second time or a difference between the signals received from the energy harvester 106 at the first time and the signals received from the energy harvester 106 at the second time).

In FIG. 2B, an analog-to-digital converter (ADC) 204 receives the combined signals from the AFE circuit 202, and the (digital) output from the ADC 204 is provided to one or more processors 206. In some embodiments, the one or more processors 206 comprise digital logic circuitry. In some embodiments, the AFE circuit 202, the ADC 204, and the one or more processors 206 correspond to, or are included in, the one or more electrical components 140 shown in FIG. 1E. In some embodiments, the AFE circuit 202, the ADC 204, and the one or more processors 206 are separately packaged. In some embodiments, the AFE circuit 202, the ADC 204, and the one or more processors 206 are integrated in a single package (e.g., within a single semiconductor package).

As illustrated in FIG. 2B, the combined signals may be sinusoidal when the vehicle is moving in a steady state (and the wheel is rotating in a steady state). Thus, in some embodiments, the one or more processors 206 determine whether the combined signals are sinusoidal (e.g., by performing a Fourier transform and determining whether the combined signals are sinusoidal based on a number and amplitudes of different frequency components). In some embodiments, in accordance with a determination that the combined signals are sinusoidal (or substantially sinusoidal), the vehicle (and/or the wheel) is deemed to be in a steady state. On the other hand, the combined signals may not be sinusoidal while the vehicle is accelerating or decelerating (and/or other vehicle events, such as brake creep, groan, and jerk, are occurring and/or road conditions, such as speed bumps, potholes, and slipping, are experienced by the vehicle and the wheel and/or vehicle weight distribution on the wheels is uneven). Thus, in some embodiments, in accordance with a determination that the combined signals are not sinusoidal (or substantially not sinusoidal), the vehicle (and/or the wheel) is deemed to be not in a steady state. In some embodiments, combined signals are received for multiple wheels (e.g., each of the wheels of the vehicle) and differences between the combined signals are used to determine performance differences between wheels (e.g., due to load distribution, tire inflation, tire wear, and the like).

Figure 3A:
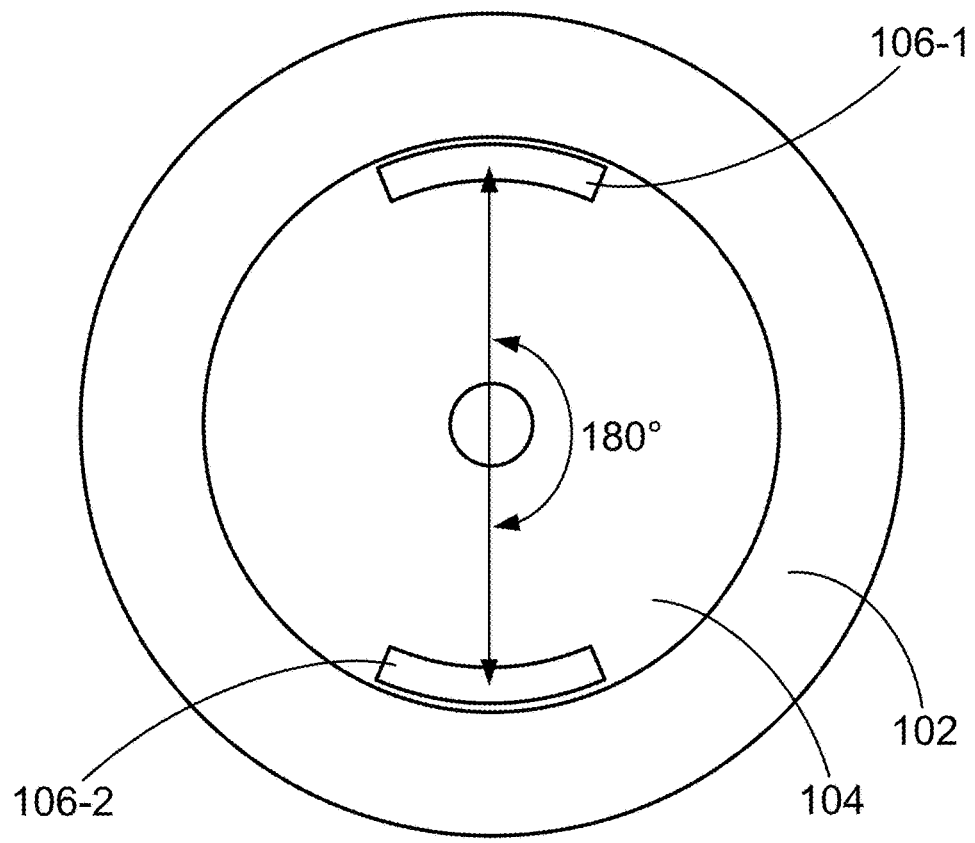
FIG. 3A is a schematic diagram illustrating energy-harvesting devices mounted on a wheel in accordance with some embodiments.

FIG. 3A is similar to FIG. 1B except that, in FIG. 3A, two energy harvesters 106-1 and 106-2 are positioned adjacent to the wheel 104 in accordance with some embodiments. In some embodiments, the energy harvester 106-1 and the energy harvester 106-2 are positioned in opposite directions from a center of the wheel 104 (e.g., the angle formed by the direction from the center of the wheel 104 to the energy harvester 106-1 and the direction from the center of the wheel 104 to the energy harvester 106-2 is 180°). In some embodiments, the two energy harvesters are substantially opposite of one another (e.g., the angle between them is in the range of 160° to 200°).

Figure 3B:
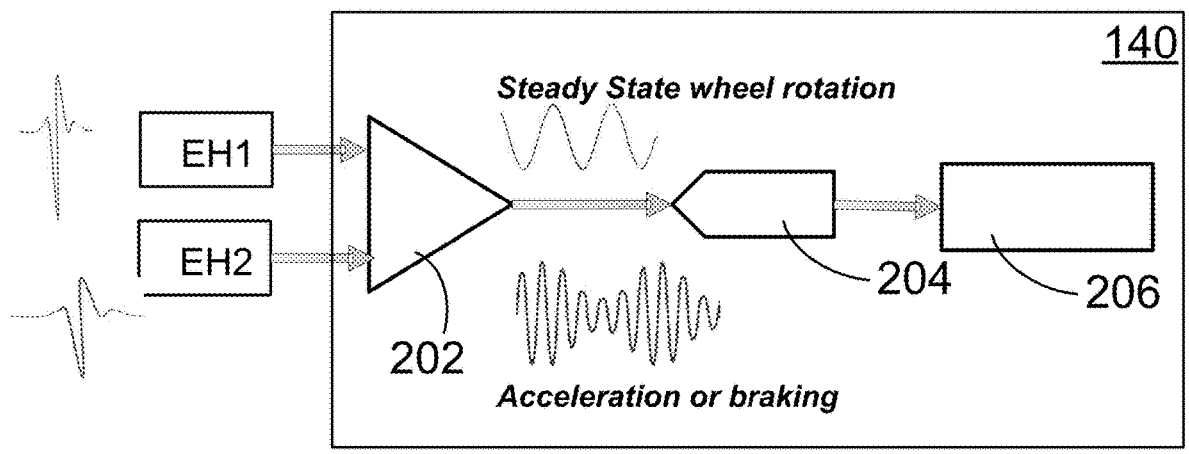
FIG. 3B shows example electrical components that may be used to process signals from energy harvesters in accordance with some embodiments.

FIG. 3B is similar to FIG. 2B except that, in FIG. 3B, the AFE circuit 202 receives signals from two separate energy harvesters (e.g., the energy harvesters 106-1 and 106-2 shown in FIG. 3A) instead of one energy harvester in accordance with some embodiments. In some embodiments, the AFE circuit 202 combines the signals received from the energy harvester 106-1 and the signals received from the energy harvester 106-2 (e.g., the AFE circuit 202 generates signals representing a superposition of the signals received from the energy harvester 106-1 and the signals received from the energy harvester 106-2 or a difference between the signals received from the energy harvester 106-1 and the signals received from the energy harvester 106-2). In some embodiments, the signals from the two energy harvesters are generated concurrently (e.g., simultaneously). Thus, an electrical component to store the signals from one or both energy harvesters or delay the signals from one or both energy harvesters may not be needed in such configurations.

Although FIGS. 2B and 3B show certain electrical components, in some embodiments, additional components may be used (e.g., to perform additional operations, such as inverting signals or phase matching signals). In some embodiments, the operations described with respect to FIGS. 2B and 3B are performed using additional or fewer components (e.g., a particular operation may be performed by two or more components). In some embodiments, two or more components shown in FIGS. 2B and 3B may be combined or integrated. For brevity, such details are not repeated herein.

Figure 3C:
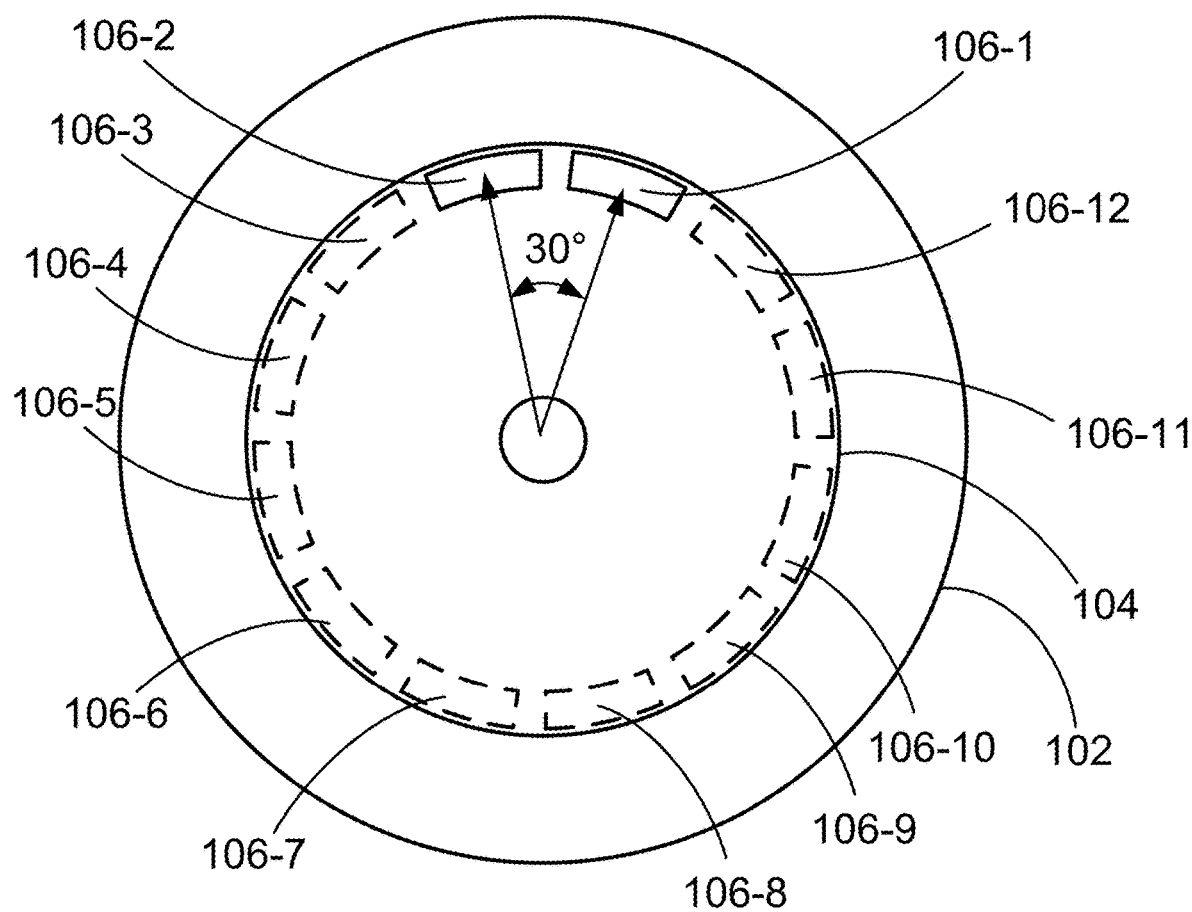
FIG. 3C is a schematic diagram illustrating energy-harvesting devices mounted on a wheel in accordance with some embodiments.

FIG. 3C is similar to FIG. 3A except that, in FIG. 3C, two energy harvesters 106-1 and 106-2 are not positioned in opposite directions in accordance with some embodiments. For example, the angle formed by the direction from the center of the wheel 104 to the energy harvester 106-1 and the direction from the center of the wheel 104 to the energy harvester 106-2 is not 180° (e.g., 1°, 5°, 10°, 15°, 20°, 25°, 30°, 35°, 40°, 45°, 50°, 55°, 60°, 65°, 70°, 80°, 90°, 100°, 110°, 120°, 130°, 140°, 150°, 160°, 170°, or 179°, or within an interval between any two of the aforementioned values). Placing two energy harvesters adjacent to each other (e.g., at an angle less than 45°, 30°, 15°, 10°) or 5°) facilitates detecting irregularities in the road conditions (e.g., bumps) in some situations.

As shown in FIG. 3C, more than two energy harvesters may be mounted adjacent to the wheel 104. For example, three, four, five, six, seven, eight, nine, ten, eleven, twelve, or more energy harvesters may be mounted adjacent to the wheel 104. In some embodiments, the energy harvesters are arranged radically symmetrically adjacent to the wheel 104.

Figure 4A:
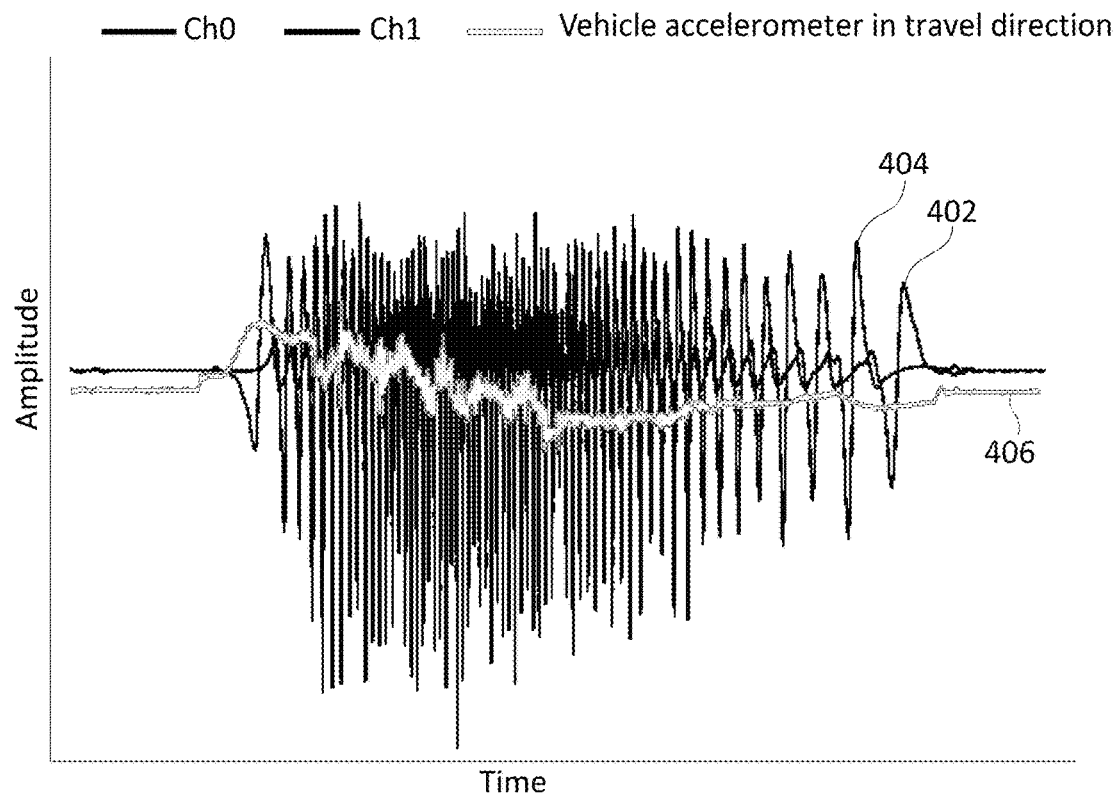
FIG. 4A shows example signals from two energy harvesters along with an output from an accelerometer indicating acceleration and deceleration of the vehicle in its travel direction in accordance with some embodiments.

FIG. 4A shows example signals from two energy harvesters (positioned on opposite sides as shown in FIG. 3A), along with an output from an accelerometer indicating acceleration and deceleration of the vehicle in its travel direction in accordance with some embodiments. Specifically, FIG. 4A shows example signals from the first energy harvester 402 (Ch0), the second energy harvester 404 (Ch1), and the vehicle accelerometer 406.

Figure 4B:
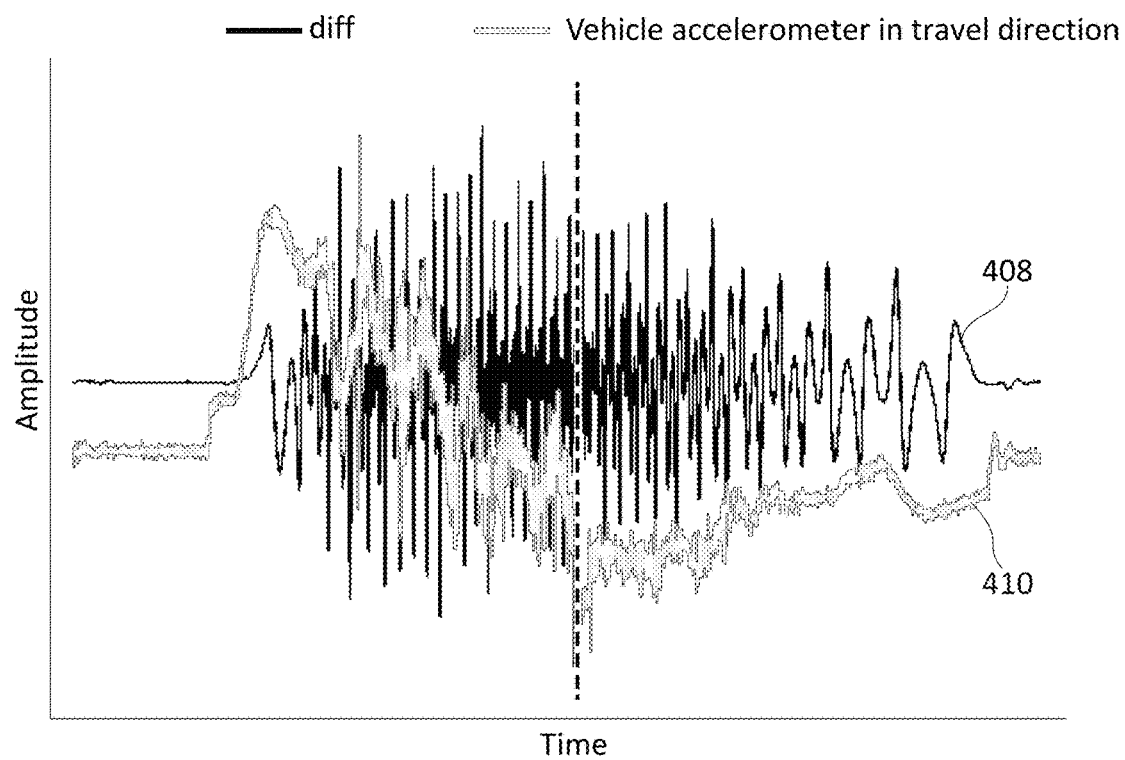
FIG. 4B shows a difference between the signals from the two energy harvesters shown in FIG. 4A in accordance with some embodiments.

FIG. 4B shows a difference between the example signals from the two energy harvesters, along with the output from the accelerometer indicating acceleration and deceleration of the vehicle in its travel direction in accordance with some embodiments. Specifically, FIG. 4B shows an example signal difference 408 between the first energy harvester and the second energy harvester. FIG. 4B further shows a signal from the vehicle accelerometer 410.

Figure 4C:
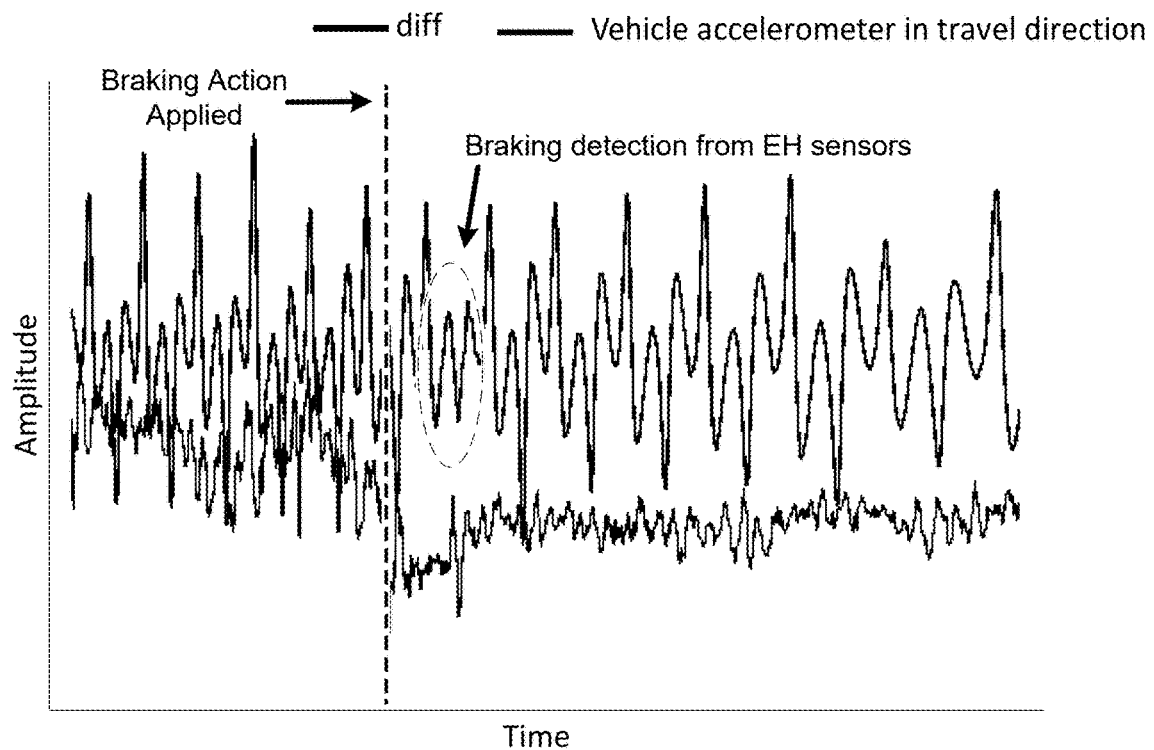
FIG. 4C is an enlarged view of the difference signals shown in FIG. 4B in accordance with some embodiments.

FIG. 4C is an enlarged view of the difference signals shown in FIG. 4B, along with the output from the accelerometer indicating acceleration and deceleration of the vehicle in its travel direction. FIG. 4C shows that the energy harvesters detect braking of the vehicle (in the signal 408) shortly after a braking action was applied (e.g., less than 1 second, 0.9 seconds, 0.8 seconds, 0.7 seconds, 0.6 seconds, 0.5 seconds, 0.4 seconds, 0.3 seconds, 0.2 seconds, etc.) in accordance with some embodiments.

Figure 4D:
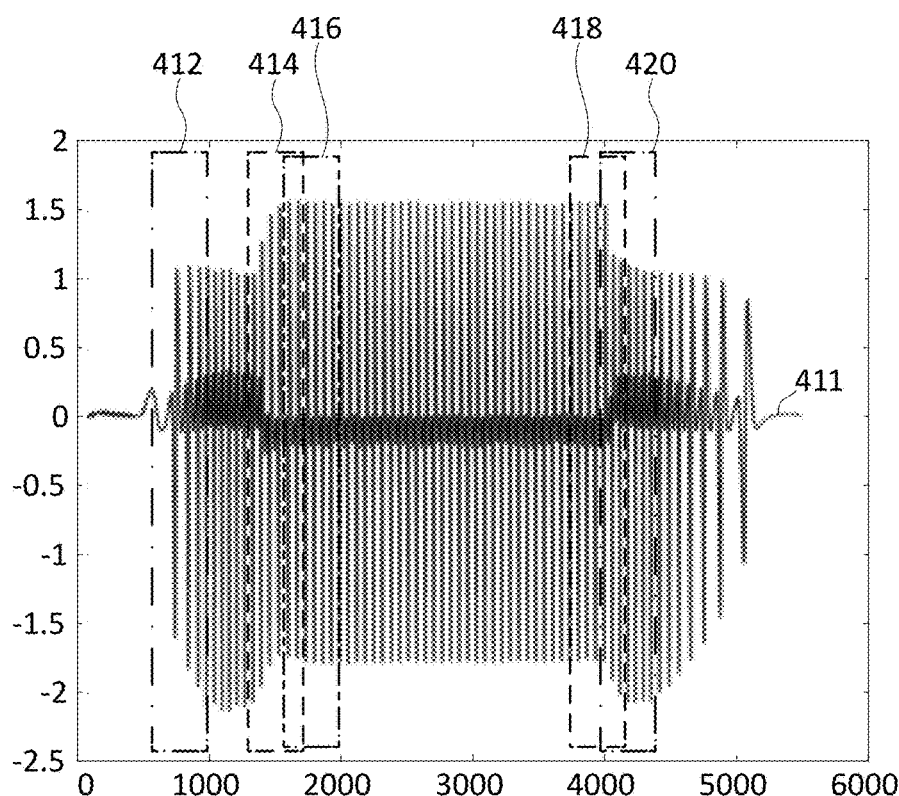
FIG. 4D shows a reference waveform from a sensor module in accordance with some embodiments.
Figure 4E:
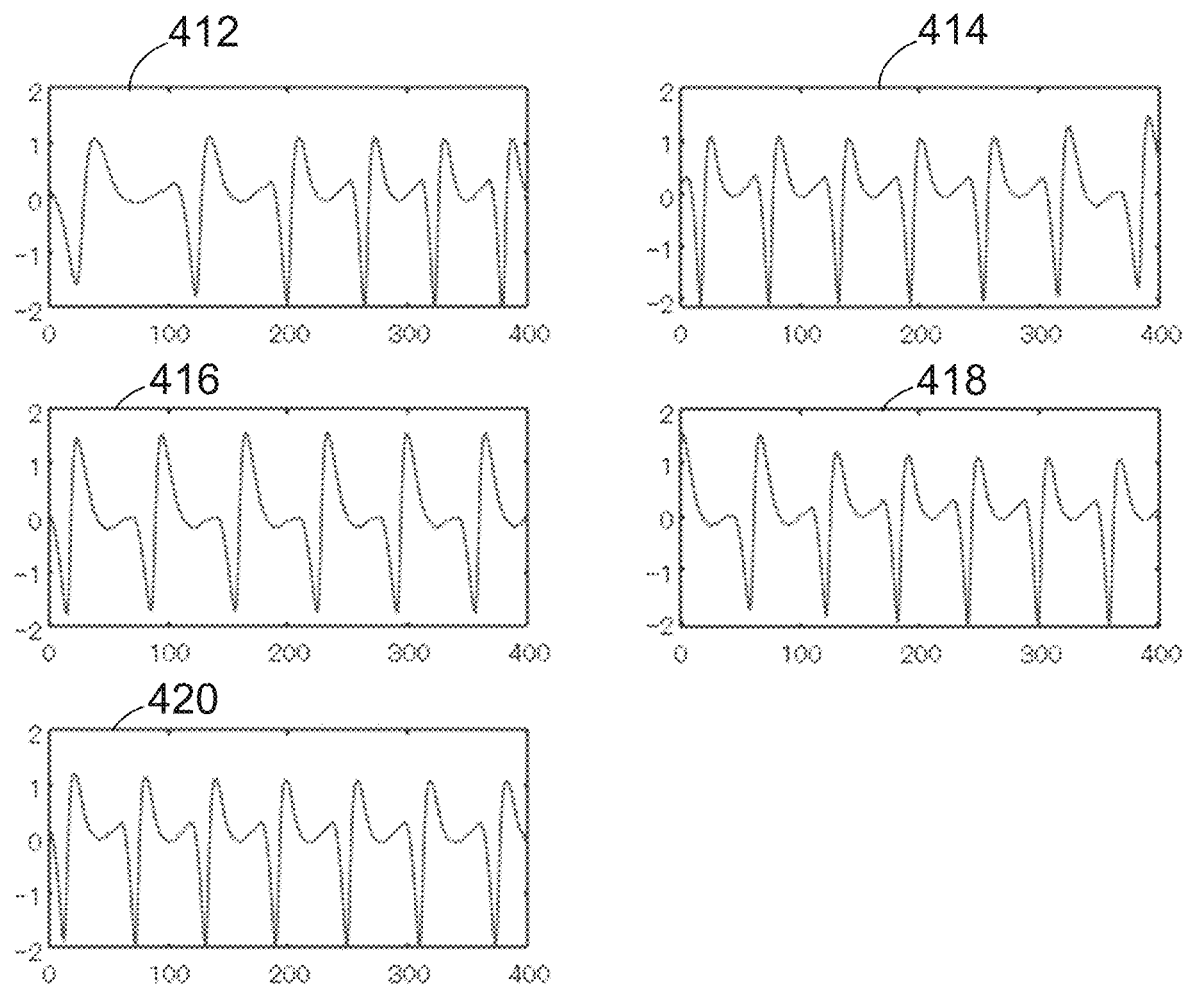
FIG. 4E shows enlarged views of different regions of the reference waveform shown in FIG. 4D in accordance with some embodiments.

FIG. 4D shows a reference waveform 411 from a sensor module in accordance with some embodiments. FIG. 4D shows separate portions of the waveform 411 indicated by the regions 412, 414, 416, 418, and 420. FIG. 4E shows enlarged views of different regions of the waveform shown in FIG. 4D in accordance with some embodiments. In some embodiments, the region 412 corresponds to acceleration of the vehicle. In some embodiments, the region 414 corresponds to the vehicle transitioning from a state of acceleration to a state of constant speed. In some embodiments, the region 416 corresponds to the vehicle traveling at the constant speed (e.g., transitioning from a state of acceleration to a state of constant speed). In some embodiments, the region 418 corresponds to the vehicle starting to decelerate from the constant speed (e.g., transitioning from a state of constant speed to a state of deceleration). In some embodiments, the region 420 corresponds to deceleration of the vehicle.

Figure 4F:
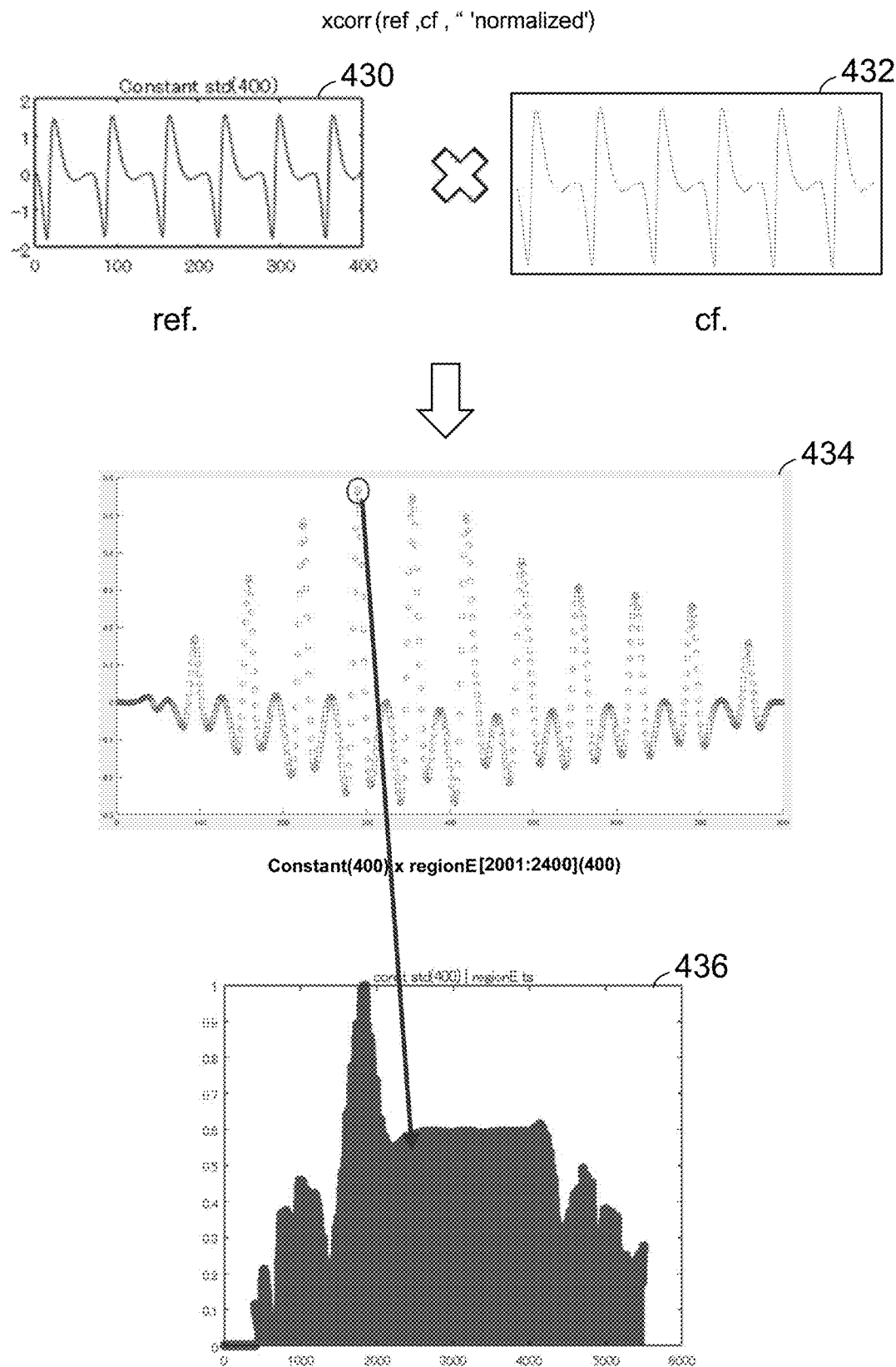
FIG. 4F shows an example cross-correlation process in accordance with some embodiments.

In some embodiments, a cross-correlation metric (e.g., a measure of similarity of two series as a function of the displacement of one relative to the other) is used to identify state changes in the vehicle movement. FIG. 4F shows an example cross-correlation process in accordance with some embodiments. As shown in FIG. 4F, a reference signal 430 is obtained (e.g., corresponding to the region 416 in which the vehicle is traveling at a constant speed). The reference signal 430 is cross-correlated with an input signal 432 to generate the output correlation graph 434. The maximum value of the correlation graph 434 is plotted as shown in graph 436. In some embodiments, the (normalized) cross-correlation is calculated by aligning the lengths of the reference and input vectors. In some embodiments, an input signal is sampled to have a same length as the reference signal (e.g., a subset of the input signal is selected based on a number of data points in the reference signal, or vice versa). In some embodiments, the cross-correlation is calculated by shifting input signal every sample (e.g., 2 milliseconds (ms), 4 ms, 8 ms, or 16 ms).

In some embodiments, a (normalized) cross-correlation is calculated for each drive state (e.g., constant speed, acceleration, deceleration, and transitioning between constant speed and acceleration/deceleration). In some situations, the constant speed used as the reference data and the correlation with other data is high in other states. In some embodiments, the timing at which the drive status changes is calculated from the cross-correlation. In this way, the sensor modules described herein can be used to detect brake timing.

Figure 4G:
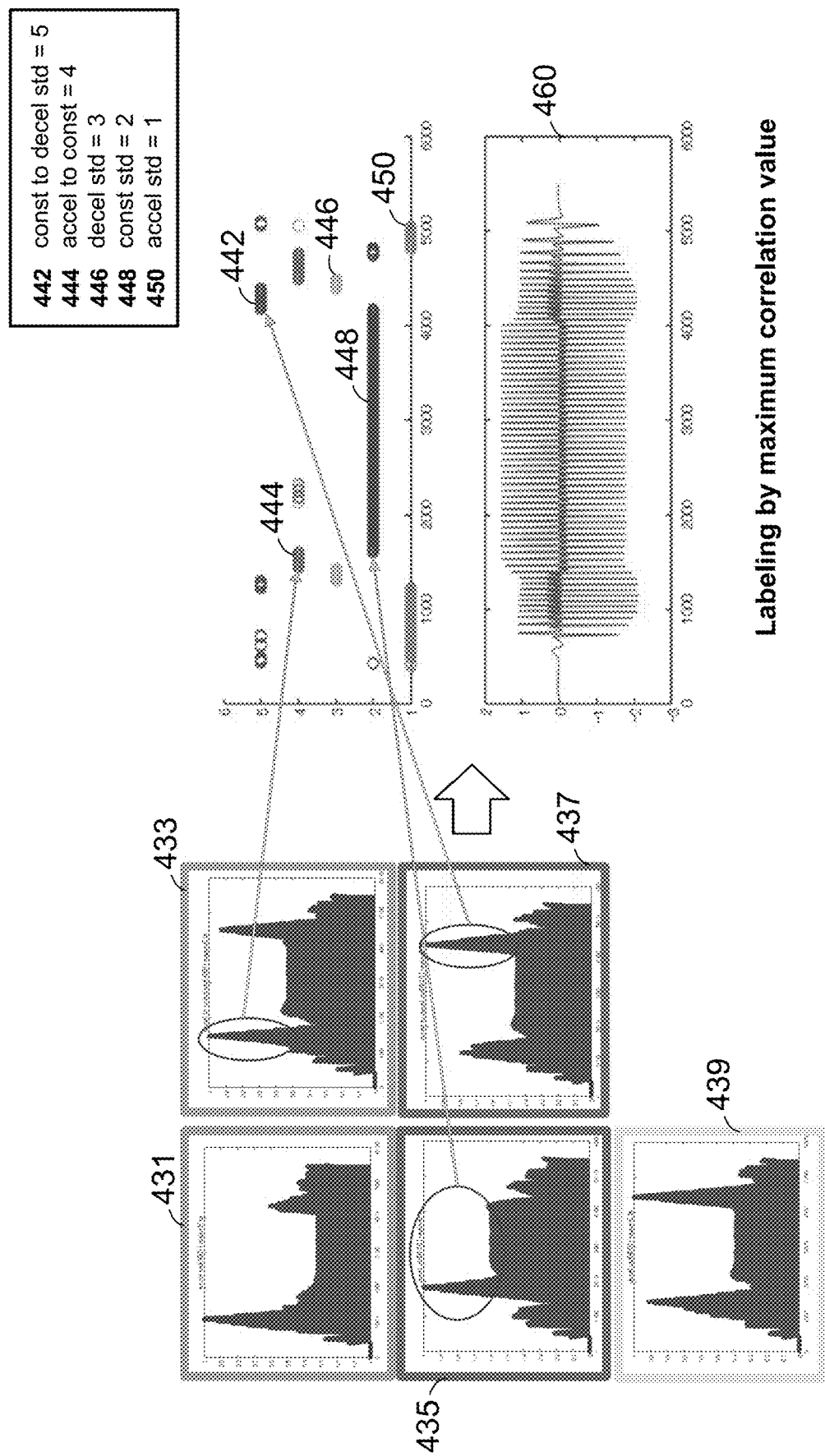
FIG. 4G shows an example correlation mapping in accordance with some embodiments.

FIG. 4G shows an example correlation mapping in accordance with some embodiments. As shown in FIG. 4G, an input correlation graph 431 maps to an acceleration state 450, an input correlation graph 433 maps to an acceleration to constant speed state 444, an input correlation graph 435 maps to a constant speed state 448, an input correlation graph 437 maps to constant speed to deceleration state 442, and an input correlation graph 439 maps to a deceleration state 446 in accordance with some embodiments. In some embodiments, a constant speed state is used as a reference signal for correlation mapping. In some embodiments, a boundary of the drive statuses shows a highest value at the location where the speed transitions to/from a constant speed state. The graph 460 shows a corresponding waveform from the sensor module for the states 442, 444, 446, 448, and 450.

Figure 5A:
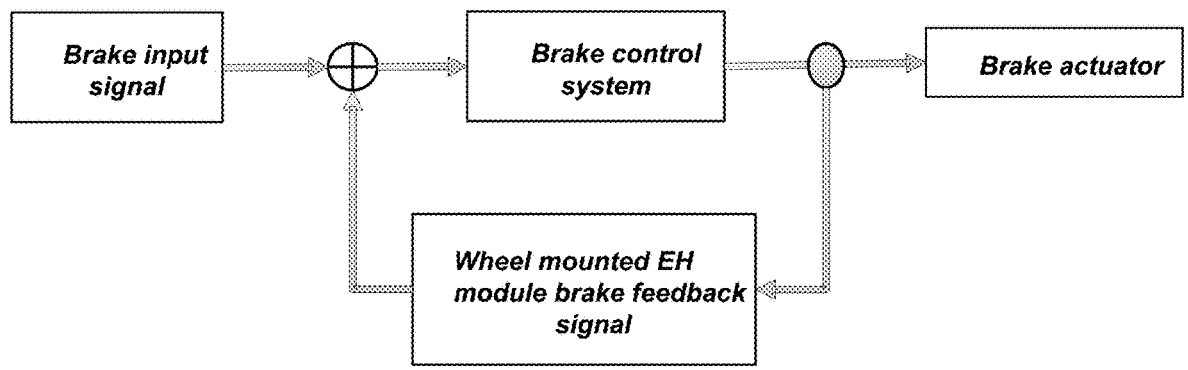
FIG. 5A is a block diagram illustrating active control of brake actuator(s) in accordance with some embodiments.

FIG. 5A is a block diagram illustrating active control of brake actuator(s) in accordance with some embodiments. In FIG. 5A, brake input signals (e.g., from a brake pedal) are provided to a brake control system, which provides control signals to activate a brake actuator (for applying a brake) or deactivate the brake actuator (for disengaging the brake). In some embodiments, signals from one or more energy harvesters are provided to the brake control system so that the brake control system provides modified control signals to the brake actuator. For example, while the brake control system provides control signals to the brake actuator (in accordance with the brake input signal indicating that an operator has pressed on the brake pedal), the brake control system may receive signals from the one or more energy harvesters indicating that one or more wheels (or tires) are slipping and modify control signals provided to the brake actuator to initiate anti-lock braking operations (e.g., providing pulsed control signals) until signals indicating slipping are no longer received. In some embodiments, the brake control system receives signals from respective energy harvester(s) at multiple wheels (e.g., each wheel) of the vehicle. In some embodiments, the brake control system modifies each wheel individually based on the corresponding energy harvester signals (e.g., applies distinct anti-lock braking operations at each wheel).

Figure 5B:
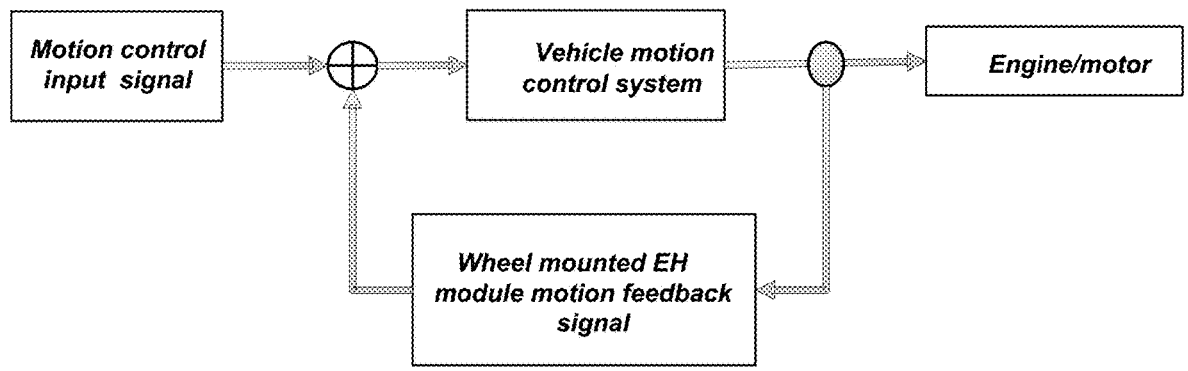
FIG. 5B is a block diagram illustrating active control of a motor in accordance with some embodiments.

FIG. 5B is a block diagram illustrating active control of a motor (e.g., an electrical motor, a combustion engine, or both) in accordance with some embodiments. In some embodiments, a vehicle motion control system provides control signals to the motor (e.g., based on brake input signals and/or accelerator input signals). In some embodiments, signals from one or more energy harvesters are also provided to the vehicle motion control system, which modifies control signals provided to the motor based on the signals received from the one or more energy harvesters. For example, the vehicle motion control system adjusts one or more cruise control settings based on the signals received from the one or more energy harvesters. In some embodiments, a vehicle suspension system is adjusted based on the signals received from the one or more energy harvesters. In some embodiments, the vehicle suspension system is adjusted based on a comparison of respective signals from energy harvesters on respective wheels of the vehicle. For example, the vehicle stability and ride comfort are controlled separately based on the specific feedback signal(s) from each wheel. In some embodiments, the vehicle includes multiple motor drives, and each motor drive is (separately) adjusted based on feedback signal(s) from the wheels. For example, motion control is applied separately to each drive system based on the feedback signals from different wheels.

Figure 6:
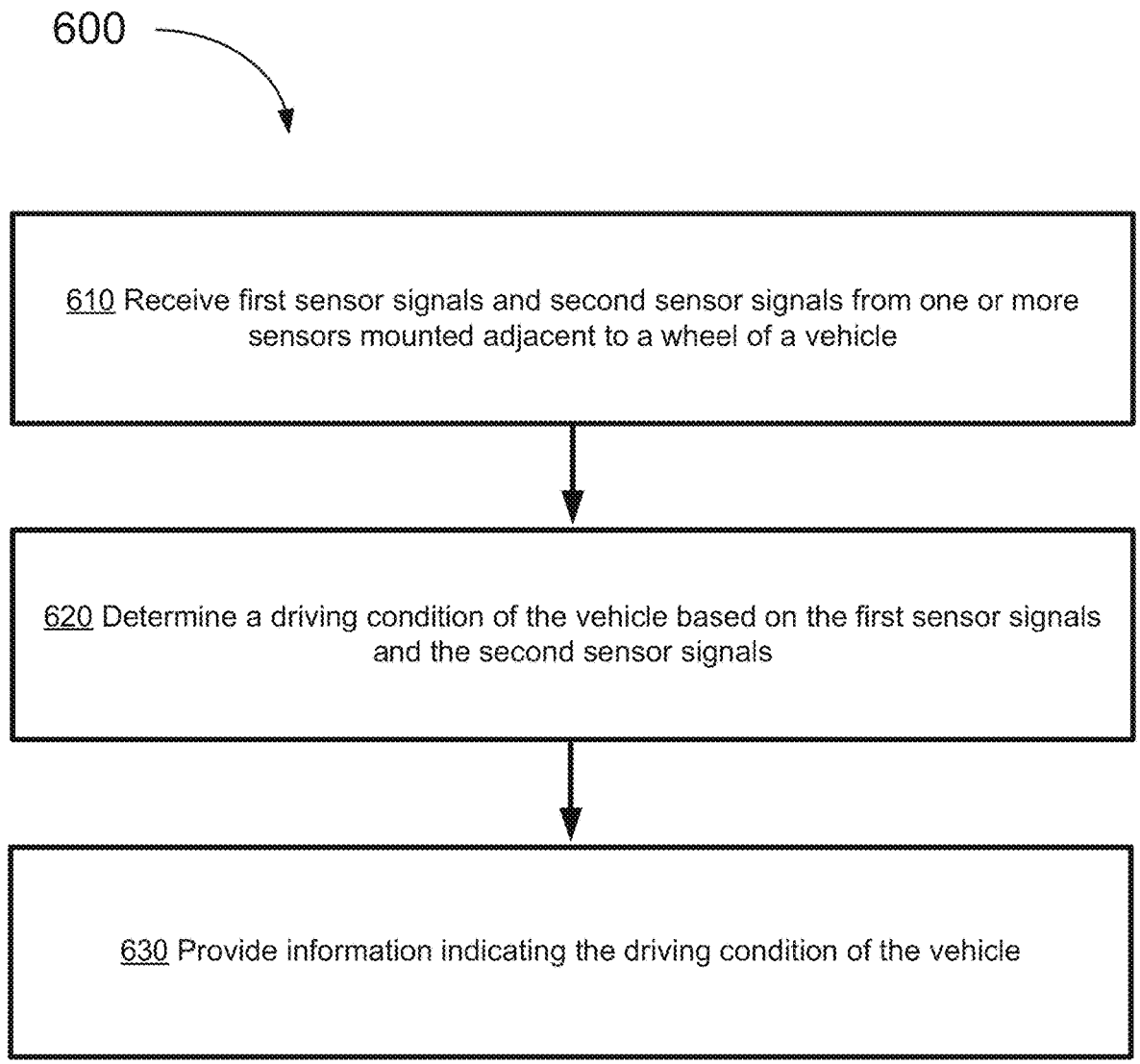
FIG. 6 is a flow diagram illustrating a method of processing signals from one or more sensors mounted adjacent to a wheel of a vehicle in accordance with some embodiments.

FIG. 6 is a flow diagram illustrating a method 600 of processing signals from one or more sensors mounted adjacent to a wheel of a vehicle in accordance with some embodiments. In some embodiments, the method 600 is performed by a control circuit (e.g., one or more processors) mounted on the vehicle. For example, the method 600 may be performed by the electrical components 140.

The method 600 includes (610) receiving first sensor signals and second sensor signals from one or more sensors (e.g., one or more energy harvesters, vibration sensors, etc.) mounted adjacent to a wheel (e.g., wheel 104) of a vehicle (e.g., vehicle 100).

In some embodiments, the first sensor signals are from a first sensor of the one or more sensors, and the second sensor signals are from a second sensor, distinct from the first sensor, of the one or more sensors. For example, as described with respect to FIGS. 3A and 3B, the energy harvesters 106-1 and 106-2 provide separate sensor signals to the one or more electrical components 140 (e.g., the AFE circuit 202).

In some embodiments, the first sensor is located in a first radial direction on the wheel, and the second sensor is located in a second radial direction, distinct from the first radial direction, on the wheel. In some embodiments, the second radial direction is opposite to the first radial direction (e.g., energy harvesters 106-1 and 106-2 in FIG. 3A). In some embodiments, the second radial direction is offset from the first radial direction by an offset angle of at least 15 degrees (e.g., energy harvesters 106-1 and 106-2 in FIG. 3C).

In some embodiments, the first sensor signals are from a first sensor of the one or more sensors over a first time period, and the second sensor signals are from the first sensor of the one or more sensors over a second time period that is distinct from the first time period. For example, as described with respect to FIGS. 2A and 2B, the first sensor signals and the second sensor signals are collected by a same sensor (e.g., a single energy harvester 106 shown in FIG. 1B) at different times (e.g., t1 and t2).

The method 600 includes (620) determining a driving condition (e.g., acceleration, deceleration, other vehicle events, road conditions, load distribution, etc.) of the vehicle based on the first sensor signals and the second sensor signals.

In some embodiments, the method 600 also includes obtaining a superposition of the first sensor signals and the second sensor signals (e.g., the AFE circuit 202 may be configured to provide a superposition of the first sensor signals and the second sensor signals). Determining the driving condition of the vehicle based on the first sensor signals and the second sensor signals includes determining the driving condition of the vehicle based on the superposition of the first sensor signals and the second sensor signals.

In some embodiments, the method 600 also includes obtaining a difference between the first sensor signals and the second sensor signals (e.g., the AFE circuit 202 may be configured to provide a difference between the first sensor signals and the second sensor signals). Determining the driving condition of the vehicle based on the first sensor signals and the second sensor signals includes determining the driving condition of the vehicle based on the difference between the first sensor signals and the second sensor signals.

In some embodiments, the method 600 also includes providing information indicating the driving condition of the vehicle. For example, the information indicating the driving condition may be provided to one or more controllers.

In some embodiments, the method 600 also includes adjusting operation of a brake of the vehicle in accordance with the determined driving condition of the vehicle (e.g., by providing the information indicating the driving condition to the brake control system as shown in FIG. 5A).

In some embodiments, the method 600 also includes adjusting operation of a motor of the vehicle in accordance with the determined driving condition of the vehicle (e.g., by providing the information indicating the driving condition to the vehicle motion control system as shown in FIG. 5B).

(A1) In one aspect, some embodiments include a method (e.g., the method 600) of determining driving conditions of a vehicle (e.g., driving state and/or road conditions). In some embodiments, the method is performed at a sensor module, control circuitry, and/or one or more processors (e.g., the electrical components 140). The method includes: (1) receiving first sensor signals and second sensor signals from one or more energy harvesting sensors (e.g., the energy-harvesting device 106) mounted adjacent to a wheel (e.g., the wheel 104) of a vehicle; and (2) determining a driving condition of the vehicle based on the first sensor signals and the second sensor signals.

(A2) In some embodiments of A1: (i) the first sensor signals are from a first energy harvester (e.g., the energy-harvesting device 106-1) of the one or more energy harvesting sensors; and (ii) the second sensor signals are from a second energy harvester (e.g., the energy-harvesting device 106-2) of the one or more energy harvesting sensors, the second energy harvester being distinct from the first energy harvester.

(A3) In some embodiments of A2: (i) the first energy harvester is located in a first radial direction on the wheel; and (ii) the second energy harvester is located in a second radial direction on the wheel, the second radial direction being offset from the first radial direction by an offset angle of at least 15 degrees (e.g., offset by an angle of 180 degrees as illustrated in FIG. 3A).

(A4) In some embodiments of A1: (i) the first sensor signals are from a first sensor of the one or more energy harvesting sensors over a first time period; and (ii) the second sensor signals are from the first sensor over a second time period that is distinct from the first time period.

(A5) In some embodiments of any of A1-A4, the method further includes obtaining a superposition of the first sensor signals and the second sensor signals, where determining the driving condition of the vehicle based on the first sensor signals and the second sensor signals includes determining the driving condition of the vehicle based on the superposition of the first sensor signals and the second sensor signals.

(A6) In some embodiments of any of A1-A4, the method further includes obtaining a difference between the first sensor signals and the second sensor signals, where determining the driving condition of the vehicle based on the first sensor signals and the second sensor signals includes determining the driving condition of the vehicle based on the difference between the first sensor signals and the second sensor signals.

(A7) In some embodiments of any of A1-A6, the method further includes adjusting operation of a brake of the vehicle in accordance with the determined driving condition of the vehicle. For example, activating, or adjusting operation of, an anti-lock braking system.

(A8) In some embodiments of any of A1-A7, the method further includes adjusting operation of a motor of the vehicle in accordance with the determined driving condition of the vehicle. For example, adjusting operation of a cruise control system based on the determined driving condition.

(A9) In some embodiments of any of A1-A8, the method further includes adjusting a vehicle suspension system of the vehicle in accordance with the determined driving condition of the vehicle.

(A10) In some embodiments of any of A1-A9, the one or more energy harvesting sensors comprise an energy harvester comprising a cantilever composed of piezoelectric material.

(A11) In some embodiments of any of A1-A10, determining the driving condition of the vehicle comprises identifying one or more of: acceleration of the vehicle, deceleration of the vehicle, turning of the vehicle, or braking of the vehicle.

(A12) In some embodiments of any of A1-A11, the method further includes: (i) receiving third sensor signals and fourth sensor signals from one or more energy harvesting sensors mounted adjacent to a second wheel of a vehicle; and (ii) determining a second driving condition of the vehicle based on a comparison between the first and second sensor signals and the third and fourth sensor signals.

(A13) In some embodiments of any of A1-A12, the method further includes adjusting operation of a braking system, a motor system, and/or a vehicle suspension system of the vehicle in accordance with the second driving condition of the vehicle.

In some embodiments, the methods described herein (e.g., the method 600 and A1-A13 above) are performed by a sensor assembly. In accordance with some embodiments, a sensor assembly includes one or more sensors (e.g., one or more energy harvesters 106) mountable adjacently to (e.g., mountable on) a wheel of a vehicle and one or more processors (e.g., one or more processors 206) electrically coupled to the one or more sensors for determining a driving condition of the vehicle based on the first sensor signals and the second sensor signals.

In some embodiments, the one or more sensors include an energy harvesting module.

In some embodiments, the one or more sensors are located between a tire bead area and a rim of the wheel.

In some embodiments, the one or more sensors include a first sensor for providing the first sensor signals and a second sensor, distinct from the first sensor, for providing the second sensor signals.

In some embodiments, the first sensor is located in a first radial direction on the wheel, and the second sensor is located in a second radial direction, distinct from the first radial direction, on the wheel.

In some embodiments, the second radial direction is opposite to the first radial direction.

In some embodiments, the second radial direction is offset from the first radial direction by an offset angle of at least 15 degrees.

In some embodiments, the first sensor is located adjacent to a first wheel, and the second sensor is located adjacent to a second wheel. For example, the first sensor is mounted to a rim of the first wheel (e.g., via the clamp 406) and the second sensor is mounted to a rim of the second wheel (e.g., via the clamp 406).

In some embodiments, the one or more sensors include a first sensor for providing the first sensor signals over a first time period and the second sensor signals over a second time period that is distinct from the first time period.

In some embodiments, the sensor assembly also includes memory for storing at least one of the first sensor signals or the second sensor signals.

In some embodiments, the one or more processors are configured for obtaining a superposition of the first sensor signals and the second sensor signals, and determining the driving condition of the vehicle based on the superposition of the first sensor signals and the second sensor signals.

In some embodiments, the one or more processors are configured for obtaining a difference of the first sensor signals and the second sensor signals, and determining the driving condition of the vehicle based on the difference of the first sensor signals and the second sensor signals.

In some embodiments, the one or more processors are configured for adjusting operation of a brake of the vehicle in accordance with the determined driving condition of the vehicle.

In some embodiments, the one or more processors are configured for adjusting operation of a motor of the vehicle in accordance with the determined driving condition of the vehicle.

In accordance with some embodiments, a wheel assembly includes a wheel and any sensor assembly described herein, where the sensor assembly is mounted adjacently to the wheel (e.g., the sensor assembly is mounted on the wheel).

It will be understood that, although the terms first, second, etc. may be used herein to describe various elements, these elements should not be limited by these terms. These terms are only used to distinguish one element from another. For example, a first cantilever could be termed a second cantilever, and, similarly, a second cantilever could be termed a first cantilever, without departing from the scope of the various described embodiments. The first cantilever and the second cantilever are both cantilevers, but they are not the same cantilever.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the principles and the various described embodiments with various modifications as are suited to the particular use contemplated.

What is claimed is:

1. A method, comprising:
   receiving first sensor signals and second sensor signals from one or more energy harvesting sensors mounted adjacent to a wheel of a vehicle;
   generating a difference waveform via superposition of the first sensor signals and the second sensor signals;
   generating a cross-correlation by cross-correlating the difference waveform with a reference waveform, the reference waveform corresponding to a steady driving condition;
   determining a driving condition of the vehicle based on a maximum value of the cross-correlation;
   generating, based on the determined driving condition, a signal indicating the determined driving condition; and
   adjusting operation of the vehicle based on the determined driving condition.

2. The method of claim 1, wherein:
   the first sensor signals are from a first energy harvester of the one or more energy harvesting sensors; and
   the second sensor signals are from a second energy harvester of the one or more energy harvesting sensors, the second energy harvester being distinct from the first energy harvester.

3. The method of claim 2, wherein:
   the first energy harvester is located in a first radial direction on the wheel; and
   the second energy harvester is located in a second radial direction on the wheel, the second radial direction being offset from the first radial direction by an offset angle of at least 15 degrees.

4. The method of claim 1, wherein:
   the first sensor signals are from a first sensor of the one or more energy harvesting sensors over a first time period; and
   the second sensor signals are from the first sensor over a second time period that is distinct from the first time period.

5. The method of claim 1, wherein adjusting the operation of the vehicle comprises:
   adjusting operation of a brake of the vehicle in accordance with receiving the signal indicating the determined driving condition of the vehicle.

6. The method of claim 1, wherein adjusting the operation of the vehicle comprises:
   adjusting operation of a motor of the vehicle in accordance with receiving the signal indicating the determined driving condition of the vehicle.

7. The method of claim 1, wherein the one or more energy harvesting sensors comprise an energy harvester comprising a cantilever composed of piezoelectric material.

8. The method of claim 1, wherein determining the driving condition of the vehicle comprises identifying one or more of: acceleration of the vehicle, deceleration of the vehicle, turning of the vehicle, or braking of the vehicle.

9. The method of claim 1, wherein the cross-correlation is generated based on a drive state of the vehicle.

10. The method of claim 1, wherein determining the driving condition comprises identifying a state change in a drive state of the vehicle.

11. A sensor assembly, comprising:
    one or more energy harvesting sensors mountable on a wheel of a vehicle; and
    an electrical component positioned inside of the wheel of the vehicle or a tire on the wheel and electrically coupled to the one or more energy harvesting sensors, wherein the electrical component comprises:
    an analog front end (AFE) circuit configured for:
       obtaining first sensor signals and second sensor signals from the one or more energy harvesting sensors, wherein the one or more energy harvesting sensors include a first sensor for providing the first sensor signals over a first time period and the second sensor signals over a second time period that is distinct from the first time period; and
       generating a difference waveform via superposition of the first sensor signals and the second sensor signals;
    an analog-to-digital converter (ADC) configured for generating a digital output corresponding to the difference waveform from the AFE circuit; and
    one or more processors configured for:
       generating a cross-correlation by cross-correlating the difference waveform with a reference waveform, the reference waveform corresponding to a steady driving condition;
       determining a driving condition of the vehicle based on a maximum value of the cross-correlation;
       generating, based on the determined driving condition, a signal indicating the determined driving condition and;
       adjusting operation of the vehicle based on the determined driving condition.

12. The sensor assembly of claim 11, wherein:
    the one or more energy harvesting sensors are mountable between a tire bead area and a rim of the wheel.

13. The sensor assembly of claim 11, wherein:
    the one or more energy harvesting sensors include a first sensor for providing the first sensor signals and a second sensor, distinct from the first sensor, for providing the second sensor signals.

14. The sensor assembly of claim 13, wherein the sensor assembly is configured to have the first sensor located in a first radial direction on the wheel and the second sensor located in a second radial direction, wherein the second radial direction is offset from the first radial direction by an offset angle of at least 15 degrees.

15. The sensor assembly of claim 11, further comprising:
    memory for storing at least one of the first sensor signals or the second sensor signals.

16. The sensor assembly of claim 11, wherein:
    the one or more processors are configured for adjusting operation of a brake of the vehicle in accordance with receiving the signal indicating the determined driving condition of the vehicle.

17. The sensor assembly of claim 11, wherein:
    the one or more processors are configured for adjusting operation of a motor of the vehicle in accordance with receiving the signal indicating the determined driving condition of the vehicle.

18. The sensor assembly of claim 11, wherein the cross-correlation is generated based on a drive state of the vehicle.

19. The sensor assembly of claim 11, wherein determining the driving condition comprises identifying a state change in a drive state of the vehicle.

* * * * *